United States Patent
Haber et al.

(10) Patent No.: US 9,897,474 B2
(45) Date of Patent: Feb. 20, 2018

(54) APPARATUS AND METHOD FOR MONITORING FUEL OIL DELIVERY

(71) Applicants: Greg Haber, Woodbury, NY (US); Craig Kirsch, Woodbury, NY (US)

(72) Inventors: Greg Haber, Woodbury, NY (US); Craig Kirsch, Woodbury, NY (US)

( * ) Notice: Subject to any disclaimer, the term of this patent is extended or adjusted under 35 U.S.C. 154(b) by 272 days.

(21) Appl. No.: 14/665,507

(22) Filed: Mar. 23, 2015

(65) Prior Publication Data

US 2015/0276452 A1 Oct. 1, 2015

Related U.S. Application Data

(60) Provisional application No. 61/970,156, filed on Mar. 25, 2014.

(51) Int. Cl.
*G01F 7/00* (2006.01)
*G01K 13/02* (2006.01)

(52) U.S. Cl.
CPC ............... *G01F 7/00* (2013.01); *G01K 13/02* (2013.01); *G01K 2013/026* (2013.01)

(58) Field of Classification Search
CPC ............ B67D 7/303; G01F 7/00; G01K 13/02
See application file for complete search history.

(56) References Cited

U.S. PATENT DOCUMENTS

| | | | | |
|---|---|---|---|---|
| 3,710,624 A * | 1/1973 | Kugler | .................... | G01F 15/02 73/233 |
| 3,990,305 A * | 11/1976 | Wallman | ................. | G01F 1/115 73/861.02 |
| 4,101,056 A * | 7/1978 | Mattimoe | .............. | B67D 7/228 222/1 |
| 4,551,719 A * | 11/1985 | Carlin | ...................... | B67D 7/32 340/3.32 |
| 4,876,530 A * | 10/1989 | Hill | ..................... | G01M 3/2892 340/605 |
| 6,397,686 B1 * | 6/2002 | Taivalkoski | ............. | B67D 7/20 73/861.78 |
| 6,575,206 B2 * | 6/2003 | Struthers | .................. | B67D 7/32 137/312 |
| 6,651,517 B1 * | 11/2003 | Olivier | ..................... | B67D 7/20 222/23 |
| 6,708,571 B1 * | 3/2004 | Hopfe | ..................... | G01F 15/02 73/861.79 |

(Continued)

*Primary Examiner* — John Fitzgerald
(74) *Attorney, Agent, or Firm* — Epstein Drangel LLP; Robert L. Epstein

(57) ABSTRACT

The apparatus for monitoring the delivery of fuel oil through a fuel oil delivery pipe including a flow meter and temperature sensor associated with the oil delivery pipe for measuring the temperature and flow rate of the fuel oil as it moves through the pipe. The digital output signals from the flow meter/temperature sensor are used to generate data signals which are a function of the measured temperature and flow rate parameters. A memory records the data signals. The actual total quantity of fuel oil delivered through the pipe is calculated based upon the data signals. A clock circuit generates a timing signal reflecting the date and time the measurements were taken. A transmission signal formed of the calculated actual total quantity of fuel oil delivered and time signal may be sent to a remote location by a WiFi transmitter or through the internet using a modem.

5 Claims, 3 Drawing Sheets

(56) References Cited

U.S. PATENT DOCUMENTS

| | | | | |
|---|---|---|---|---|
| 6,796,173 B1* | 9/2004 | Lajoie | G01F 3/10 | |
| | | | 73/261 | |
| 6,945,125 B2* | 9/2005 | Vanderah | G01F 3/10 | |
| | | | 73/861.77 | |
| 7,028,561 B2* | 4/2006 | Robertson | B67D 7/085 | |
| | | | 222/52 | |
| 7,124,621 B2* | 10/2006 | Nevius | G01F 1/66 | |
| | | | 702/100 | |
| 7,366,621 B2* | 4/2008 | Sprague | G01F 1/3209 | |
| | | | 366/17 | |
| 7,454,985 B2* | 11/2008 | Marioni | F04D 15/0088 | |
| | | | 318/717 | |
| 7,602,671 B2* | 10/2009 | Dionysiou | G01F 23/2962 | |
| | | | 367/112 | |
| 7,957,927 B2* | 6/2011 | Huitt | A61M 1/28 | |
| | | | 222/71 | |
| 8,229,695 B2* | 7/2012 | Pruysen | G01F 1/8413 | |
| | | | 702/100 | |
| 2005/0028610 A1* | 2/2005 | Olivier | B67D 7/20 | |
| | | | 73/861.79 | |
| 2005/0120806 A1* | 6/2005 | Vanderah | G01F 3/10 | |
| | | | 73/861.77 | |
| 2006/0016243 A1* | 1/2006 | Nevius | G01F 1/66 | |
| | | | 73/1.16 | |
| 2009/0013753 A1* | 1/2009 | Bell | G01F 25/0007 | |
| | | | 73/1.16 | |
| 2009/0016164 A1* | 1/2009 | Dionysiou | G01F 23/2962 | |
| | | | 367/108 | |
| 2012/0185197 A1* | 7/2012 | Lorden | G01F 9/001 | |
| | | | 702/100 | |
| 2014/0260658 A1* | 9/2014 | Strom | G01F 1/3218 | |
| | | | 73/861.01 | |

* cited by examiner

APPARATUS AND METHOD FOR MONITORING FUEL OIL DELIVERY

CROSS-REFERENCE TO RELATED APPLICATIONS

Priority is claimed on Provisional Patent Application Ser. No. 61/970,156, filed Mar. 25, 2014.

STATEMENT REGARDING FEDERALLY SPONSORED RESEARCH OR DEVELOPMENT

Not Applicable

REFERENCE TO A "SEQUENCE LISTING", A TABLE, OR A COMPUTER PROGRAM LISTING APPENDIX SUBMITTED ON COMPACT DISC

Not Applicable

BACKGROUND OF THE INVENTION

1. Field of the Invention

The present invention relates to fuel oil delivery and more particularly to an apparatus and method for accurately monitoring, calculating and transmitting the actual quantity of fuel oil delivered through a delivery pipe to a recipient, such as a residential or commercial building.

2. Description of Prior Art Including Information Disclosed Under 37 CFR 1.97 and 1.98

Fuel oil delivery records provided by the delivery company reflecting the quantity of fuel oil delivered to a recipient are not always accurate because the pumps used on fuel oil delivery trucks are not always accurate. Given the current high cost of fuel oil for heating residential and commercial buildings and for other purposes, such inaccuracies can be very costly to the home owner or business proprietor, particularly if they occur repeatedly over time.

The pumps on the fuel oil delivery trucks can be inaccurate for several reasons. Aside from the fact that the meter associated with the pumps may not be correctly calibrated, the oil pressure through the meter is designed for a specific flow rate and fluctuations in the flow rate may cause an inaccurate reading of the quantity of oil delivered. The temperature of the oil is also a factor because it affects the volume of the oil. Heat will cause fuel oil to expand and hence occupy more volume than the same amount of fuel oil at a lower temperature. Thus, the quantity of fuel oil recorded as delivered may be inflated if the temperature of the fuel oil is higher at the time it is delivered.

Accordingly, there is a need for an apparatus and method which can accurately monitor and record the actual quantity amount of fuel oil delivered to residential and commercial buildings by taking into account fluctuations in flow rate and temperature of the fuel oil at the time of delivery.

It is therefore a primary object of the present invention to provide an apparatus and method for accurately monitoring and recording the quantity of fuel oil delivered to a residential or commercial building.

It is another object of the present invention to provide an apparatus and method for accurately monitoring and recording the quantity of fuel oil delivered to a residential or commercial building, which take into account the temperature of the fuel oil at the time the fuel oil is delivered.

It is another object of the present invention to provide an apparatus and method for accurately monitoring and recording the quantity of fuel oil delivered to a residential or commercial building, which take into account fluctuations in the flow rate of the fuel oil at the time the fuel is delivered.

It is another object of the present invention to provide an apparatus and method for accurately monitoring and recording the amount of fuel oil delivered to a residential or commercial building which measures the volume of the fuel oil as the fuel oil is being delivered.

It is another object of the present invention to provide an apparatus and method for accurately monitoring and recording the quantity of fuel oil delivered to a residential or commercial building which uses the temperature, flow rate and volume of the fuel oil measured at the time the fuel oil is delivered to calculate the actual total quantity of fuel oil delivered.

It is another object of the present invention to provide an apparatus and method for accurately monitoring and recording the quantity of fuel oil delivered to a residential or commercial building which is capable of calculating and displaying the actual total quantity of fuel oil delivered and the date and time the fuel oil was delivered.

It is another object of the present invention to provide an apparatus and method for accurately monitoring and recording the quantity of fuel oil delivered to a residential or commercial building which is capable of generating an audible alarm if the temperature of the fuel oil being delivered exceeds a pre-set level.

It is another object of the present invention to provide an apparatus and method for accurately monitoring and recording the quantity of fuel oil delivered to a residential or commercial building which is capable of calculating and transmitting to a remote location the actual total quantity of fuel oil delivered and the date and time the fuel oil was delivered.

It is another object of the present invention to provide an apparatus and method for accurately monitoring and recording the quantity of fuel oil delivered to a residential or commercial building which is capable of calculating and transmitting to a remote location the actual total quantity of fuel oil delivered and the date and time the fuel oil was delivered by WiFi or mode.

BRIEF SUMMARY OF THE INVENTION

To those and to other objects which may hereinafter appear, one aspect of the present invention relates to apparatus for monitoring and recording the delivery of fuel oil through a fuel oil delivery pipe including means associated with the oil delivery pipe for measuring the temperature and flow rate of the fuel oil as it moves through the pipe. The apparatus includes means for generating data signals with are a function of the measured temperature and flow rate parameters. Means are also provided for recording the data signals and for calculating the actual total quantity of fuel oil delivered through the pipe based upon the data signals.

Means are provided for recording the time that the temperature and flow rate parameters were measured and for generating a time signal which is a function thereof.

Means are provided for generating a transmission signal which is a function of the calculated actual total quantity of fuel oil delivered and the time signal.

Means are also provided for transmitting the transmission signal to a remote location. The transmitting means may include a WiFi transmitter or a modem for transmitting the transmission signals through the internet.

Means are also provided for generating an audible alarm if the temperature of the fuel oil being delivered exceeds a pre-set level.

In accordance with another aspect of the present invention, a method is provided for monitoring the delivery of fuel oil through a fuel oil delivery pipe, the method includes the steps of measuring the temperature and flow rate of the fuel oil as it moves through the delivery pipe, generating data signals which are a function of the measured temperature and flow rate of the fuel oil, recording the data signals, and calculating the actual total quantity of fuel oil delivered through the pipe based upon the data signals.

The method includes the step of displaying the calculated actual total quantity of fuel oil delivered through the pipe.

The method includes the step of generating and displaying a time signal indicating the date and time that the temperature and flow rate of the fuel oil were measured.

The method further includes generating a transmission signal which is a function of the calculated actual total quantity of fuel oil delivered and time signal.

The method further includes transmitting the transmission signal to a remote location using a WiFi transmitter or sending the transmission signal to a remote location through the internet using a modem.

The method further includes generating an audible alarm if the temperature of the fuel oil being delivered exceeds a pre-set level.

BRIEF DESCRIPTION OF THE SEVERAL VIEWS OF DRAWINGS

To these and to such other objects that may hereinafter appears, the present invention relates to an apparatus and method for monitoring fuel oil delivery as described in detail in the following specification and recited in the annexed claims, taken together with the accompanying drawings, in which like numerals refer to like parts and in which:

DETAILED DESCRIPTION OF THE INVENTION

Figure 1:
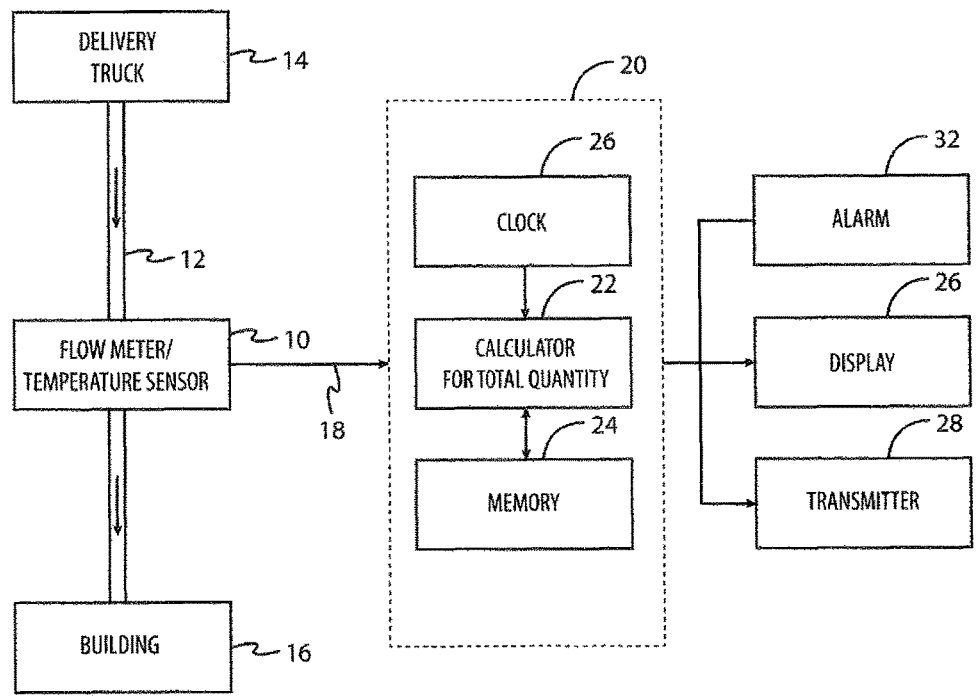
FIG. 1 is a block diagram of the apparatus of the present invention.

As seen in FIG. 1, the flow meter/temperature sensor component 10 is inserted into the delivery pipe 12 which extends between the fuel oil delivery truck 14 and the building 16 to which the fuel oil is to be delivered. Truck 14 has an associated pump which causes the fuel oil in the truck tank to flow through pipe 12 to a fuel storage tank within or proximate to building 16. Pipe 12 is customarily at least 2 inches in diameter such that the fuel oil can be transferred from the truck to the building in a relatively short time.

Flow meter/temperature sensor component 10 may include a fuel or oil flow meter designed for use with a 2 inch pipe, such as Part No. 113900-9502, commercially available from Great Plains Industries of Santa Ana, Calif. The flow meter includes an internal wheel situated in the flow path which revolves. The number of revolutions per time interval provides a measurement of the flow rate of the fuel oil passing through pipe 12. The flow meter generates a digital output signal which is a function of the measured flow rate of the fuel oil as it passes through the meter.

Component 10 also includes a temperature sensor, such as a programmable resolution digital thermometer, commercially available from Maxim Integrated/Dallas Semiconductor of San Jose, Calif. as Part No. DS18B20. The thermometer converts the sensed temperature into a 12-bit digital temperature signal.

The flow meter and the temperature sensor of component 10 may be combined as a single unit or may take the form of two separate units both of which are inserted into the delivery pipe. Whether formed as a single unit or separate units, the flow meter and temperature sensor generate digital output signals which are combined to form the data signals reflecting the measured flow rate and temperature of the fuel oil passing through the delivery pipe at a given time.

The data signals are transferred from component 10 to the electronic circuit 20 of the apparatus through a wire or cable 18. Circuit 20 includes a calculator circuit 22, an electronic memory 24 and a clock or timer circuit 26. Circuit 20 calculates the actual total quantity of fuel oil which is delivered to the building taking into account the flow rate fluctuations and the temperature measurements reflected in the data signals. The actual total quantity of fuel oil delivered may be displayed in numbers of gallons or liters.

Circuit 20 also generates a time signal which represents the date and time that the fuel oil was delivered to the building. The time signal is based upon the output of an internal clock or timer circuit.

The data signals, the calculated actual total quantity delivered and the time signal are stored in memory 24. Some or all of those signals can also be displayed on an LCD display 26 so that they can be observed at the site of apparatus and/or sent to a transmitter 28 for forwarding to a remote location for display and/or recording. The apparatus can be programmed to display and/or transmit various parameters including current flow rate in gallons (or liters), the temperature of the fuel oil, the type of fuel oil (gasoline or diesel) and the calculated actual total quantity of fuel oil delivered in gallons (or liters).

Transmitter 28 could take the form a WiFi transmitter for wireless communication. It could also take the form of an internet-connected computer with a modem for communication over the internet.

An alarm circuit 32 connected to circuit 20 is actuated to generate an audible alarm signal when the temperature sensed by the temperature sensor exceeds a pre-set level. The level at which the alarm will be actuated can be adjusted. The alarm will provide a real time notification if the temperature of the fuel oil being delivered is too high. In indication that the alarm has been actuated will be stored in memory 24.

Figure 2:
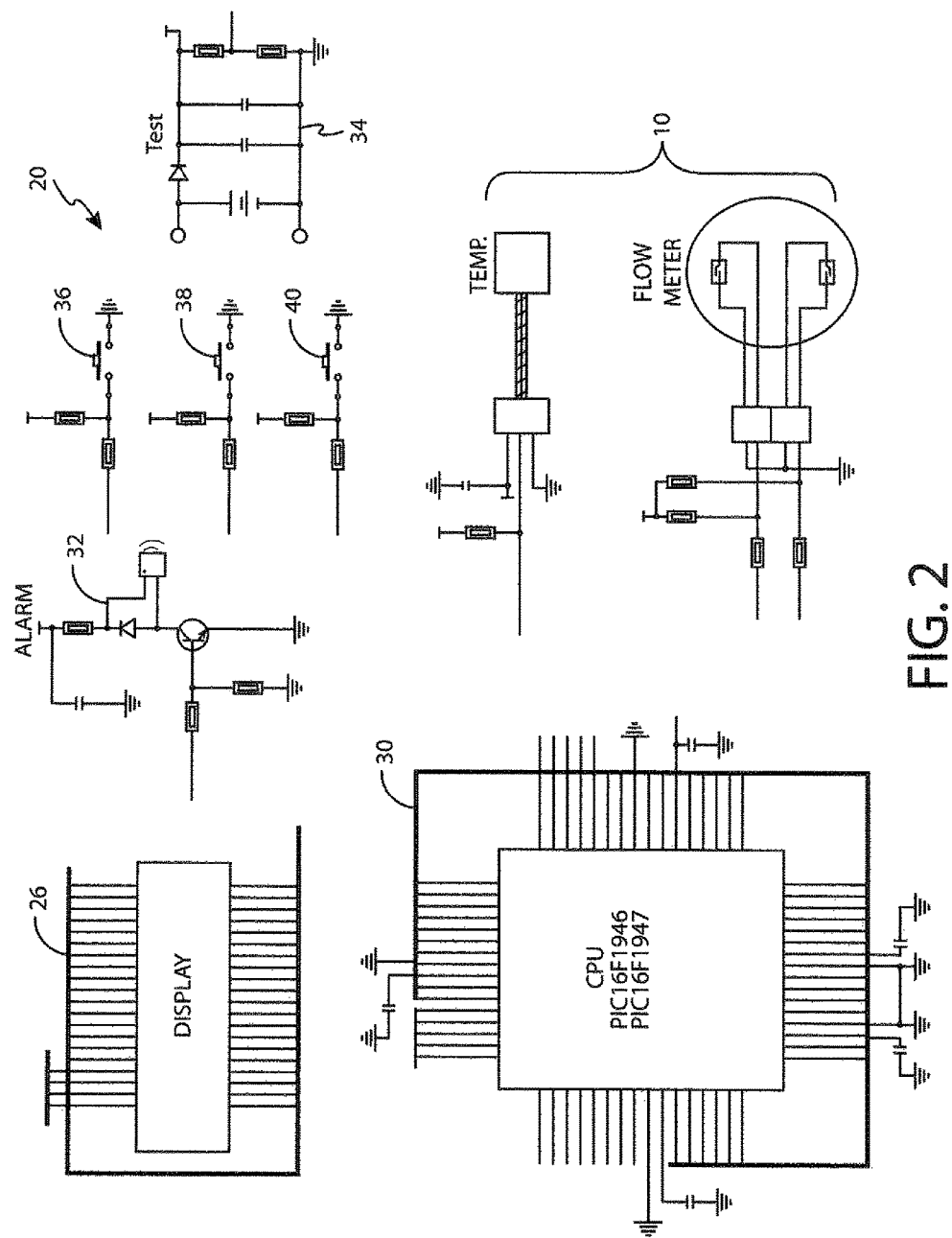
FIG. 2 is a schematic diagram of the circuit of the present invention.

FIG. 2 illustrates some of the basic sub-circuits which form circuit 20 and are connected to receive the output of the flow meter and temperature sensor of component 10. Those sub-circuits include a LCD display 26 and a CPU 30 which controls the overall function of the apparatus and forms the calculated actual total quantity of fuel oil delivered based on the data signals.

CPU 30 may be a 64-pin, flash based, 8 bit CMOS microcontroller with a LCD driver such as is commercially available from Microchip Technology Inc. of Chandler, Ariz. as Part no. PIC16f1946/PIC16f1947.

The calculated actual total quantity of fuel oil delivered is formed in the CPU by multiplying the coefficient of cubical or thermal expansion of the particular fuel being delivered per temperature degree times a factor based up the number of revolutions of the internal wheel of the flow meter per time resulting from the fluid flow. For example, the expansion factor for diesel fuel is 0.0008/c degree and the flow rate factor is 0.0747 L for a pipe of 2 inch diameter.

Memory 24 is programmed to store the expansion factors for a variety of common liquid fuels. The type of fuel being delivered is also entered into the apparatus. Circuit 20 uses that information and the measured temperature of the fuel at the time it is delivered to form the calculated actual total quantity of the fuel delivered.

An output of CPU 30 is connected to a driver circuitry for a buzzer 32 which creates an audible signal if the sensed temperature exceeds a given level. The level at which the alarm is actuated can be adjusted. An indication that the alarm has been actuated is stored in memory 24. A test circuit 34 and three programming switches 36, 38 and 40 are also connected to CPU 30.

Figure 3:
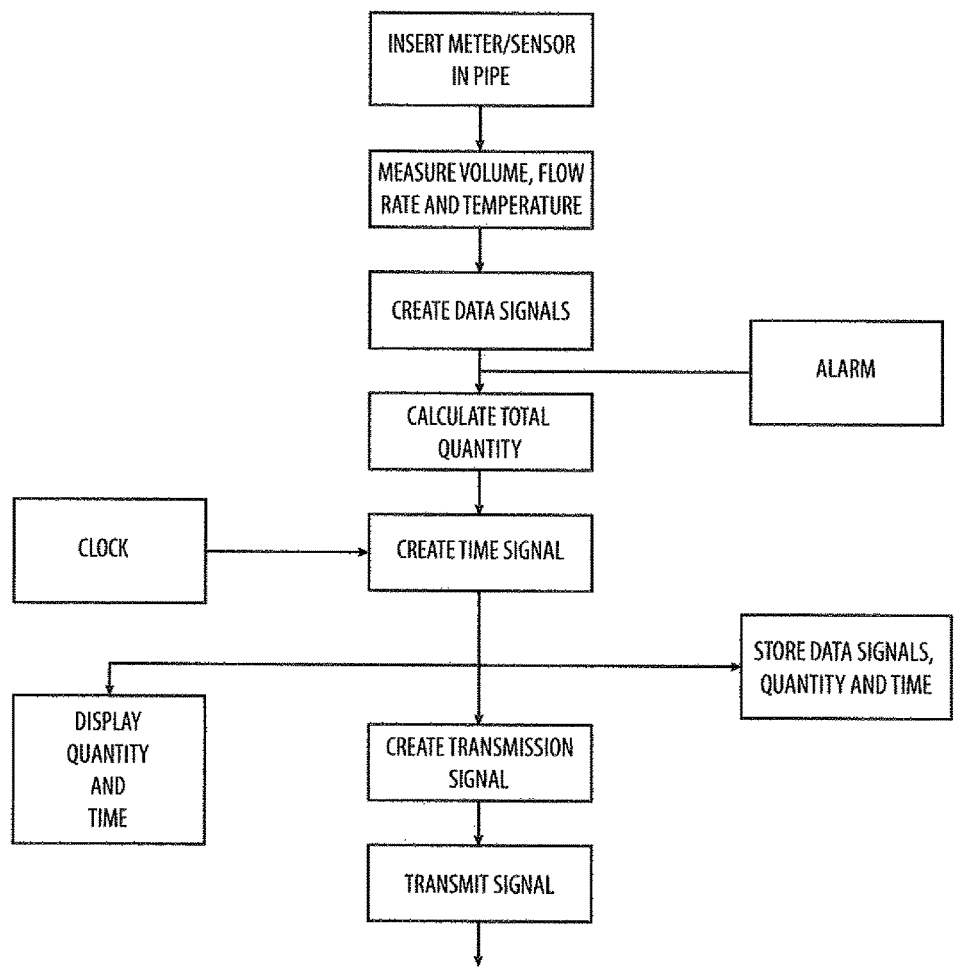
FIG. 3 is a flow chart of the steps of the method of the present invention.

FIG. 3 is a flow chart of the steps of the method of the present invention. After the flow meter and temperature sensor are inserted into the delivery pipe and circuit is initialized, the flow rate and temperature of the fuel oil passing through the pipe are measured and the data signals are created. The CPU receives the data signals and calculates the actual total quantity of fuel oil delivered in gallons or liters. The time signal is created in accordance with the output of the clock to reflect the date and time at which the parameters were measured.

The calculated actual total quantity delivered and time signal are displayed by the LCD display and stored in the memory. A transmission signal may be created based on the calculated actual total quantity delivered and the time signal. The transmission signal may then be sent to a remote location, if desired. The transmission may be accomplish using a wireless connection, such a WiFi, or through the internet using an internet-connected computer and a modem.

In the event that a temperature which exceeds a pre-set level is sensed, an alarm is actuated to generate an audible signal indicating a high temperature condition. The actuation of the alarm is stored in memory for future reference.

While only a limited number of preferred embodiments of the present invention have been disclosed for purposes of illustration, it is obvious that many modifications and variations could be made thereto. It is intended to cover all of those modifications and variations which fall within the scope of the present invention, as defined by the following claims.

We claim:

1. Apparatus for monitoring the total quantity of fuel oil delivered from a fuel oil delivery truck to a fuel oil storage tank within a building through a fuel oil delivery pipe comprising means associated with the oil delivery pipe for measuring the temperature and flow rate of the fuel oil as it moves through the pipe, an audible alarm connected to said temperature measuring means for actuating said audible alarm in response to a temperature measurement exceeding a pre-set level, an electronic circuit comprising a clock for generating a time signal representing the data and time of the fuel oil delivery being monitored, a memory for storing the coefficient of thermal expansion for the fuel oil being delivered and a calculator, means for generating data signals which are a function of the measured temperature and flow rate of the fuel oil, means for recording the data signals and the time signal, means for calculating the actual total quantity of fuel oil delivered through the pipe based upon the data signals and the stored coefficient of thermal expansion and for generating a fuel delivered signal, and means for transmitting to a remote location said fuel delivered signal, said time signal and an indication if the audible alarm has been actuated.

2. The apparatus of claim 1 wherein said recording means further comprises means for recording said fuel delivered signal.

3. The apparatus of claim 1 wherein said transmitting means comprises a WiFi transmitter.

4. The apparatus of claim 1 wherein said transmitting means comprises a modem for transmitting said fuel delivered signal, said time signal and an indication if the audible alarm has been actuated through the internet.

5. A method for monitoring the total quantity of fuel oil delivered from a fuel oil delivery truck to a fuel oil storage tank within a building through a fuel oil delivery pipe, the method comprising the steps of:
(a) measuring the temperature and flow rate of the fuel oil as it moves through the pipe;
(b) actuating an audible alarm in response to a temperature measurement exceeding a pre-set level;
(c) generating a time signal representing the date and time of the fuel oil delivery being monitored,
(d) storing the coefficient of thermal expansion for the fuel oil being delivered,
(e) generating data signals which are a function of the measured temperature and flow rate of the fuel oil,
(f) recording the data signals and the time signal,
(g) calculating the actual total quantity of fuel oil delivered through the pipe based upon the data signals and the stored coefficient of thermal expansion,
(h) generating a fuel delivered signal, and
(i) transmitting to a remote location the fuel delivered signal, the time signal and an indication if the audible alarm has been actuated.

* * * * *